United States Patent
Viswanathan

(10) Patent No.: US 10,582,247 B2
(45) Date of Patent: Mar. 3, 2020

(54) ADAPTER DEVICE FOR TELEVISION SCREEN OR CHANNEL EXTENSION AND A METHOD THEREOF

(71) Applicants: RxPrism Health Systems Private Limited, Bangalore (IN); Maruthi Viswanathan, Bangalore (IN)

(72) Inventor: Maruthi Viswanathan, Bangalore (IN)

(73) Assignee: RXPRISM HEALTH SYSTEMS PRIVATE LIMITED, Bangalore (IN)

(*) Notice: Subject to any disclaimer, the term of this patent is extended or adjusted under 35 U.S.C. 154(b) by 0 days.

(21) Appl. No.: 15/958,916

(22) Filed: Apr. 20, 2018

(65) Prior Publication Data

US 2018/0242032 A1 Aug. 23, 2018

(30) Foreign Application Priority Data

Jun. 1, 2017 (IN) .............................. 201741019234
Apr. 16, 2018 (IN) ............................. 201843014493

(51) Int. Cl.
*H04N 21/41* (2011.01)
*H04W 4/18* (2009.01)
(Continued)

(52) U.S. Cl.
CPC ..... *H04N 21/4126* (2013.01); *H04L 65/4076* (2013.01); *H04L 65/4084* (2013.01);
(Continued)

(58) Field of Classification Search
CPC ........... H04N 21/4126; H04N 21/2187; H04N 21/4122; H04N 21/43637;
(Continued)

(56) References Cited

U.S. PATENT DOCUMENTS

2004/0010588 A1* 1/2004 Slater ............... H04L 29/06027
709/224
2010/0017474 A1* 1/2010 Kandekar .......... H04N 7/17318
709/205

(Continued)

*Primary Examiner* — Michael E Teitelbaum
(74) *Attorney, Agent, or Firm* — Myers Wolin, LLC

(57) ABSTRACT

The present invention relates to a television extender adapter device (102) that enables users to extend a television content onto portable devices such as mobile phones, laptops and tablets in the vicinity of the users with a multichannel viewing option. The adapter device (102) establishes a Wi-Fi network (111) to connect a plurality of first set of portable user devices (127) and have Wi-Fi extenders to increase the strength and coverage of the Wi-Fi-network (111) thereby connecting a plurality of second set of portable user devices (128) which are connected with the Wi-Fi network (111). Therefore, the adapter device enables to extend television content to a large audience at a given public places such as hospitals, airports, bus stops, coffee shops, hotels, Railway stations, offices, waiting lobbies, lounges, sports bars, stadiums, restaurants and public transportations. The adapter device (102) render live stream link to plurality of first set of portable user devices (127) and plurality of second set of portable user devices (128) in which every television content has different live stream links to be established based on the television content opted on each of a first set of plurality of portable user devices (127) and a second set of plurality of portable user devices (128) using the wireless intranet network.

17 Claims, 6 Drawing Sheets

(51) Int. Cl.
*H04L 29/06* (2006.01)
*H04N 21/482* (2011.01)
*H04N 21/462* (2011.01)
*H04N 21/2187* (2011.01)
*H04N 21/441* (2011.01)

(52) U.S. Cl.
CPC ..... *H04N 21/2187* (2013.01); *H04N 21/4122* (2013.01); *H04N 21/4622* (2013.01); *H04N 21/4826* (2013.01); *H04W 4/18* (2013.01); *H04N 21/441* (2013.01)

(58) Field of Classification Search
CPC ......... H04N 21/44029; H04N 21/4622; H04N 21/4826; H04N 21/441482; H04L 65/1059; H04L 65/4076; H04L 65/4084; H04W 4/18; H04W 4/80; H04W 4/06; H04W 84/12
See application file for complete search history.

(56) References Cited

U.S. PATENT DOCUMENTS

| | | | | |
|---|---|---|---|---|
| 2012/0069768 | A1* | 3/2012 | Ghassemzadeh | H04B 7/061 370/252 |
| 2014/0157325 | A1* | 6/2014 | Jabara | H04N 21/64322 725/59 |
| 2014/0185494 | A1* | 7/2014 | Yang | H04W 56/0005 370/280 |
| 2015/0256790 | A1* | 9/2015 | Priest | H04N 7/01 348/441 |
| 2017/0353731 | A1* | 12/2017 | Wade | G06F 13/4022 |

\* cited by examiner

ADAPTER DEVICE FOR TELEVISION SCREEN OR CHANNEL EXTENSION AND A METHOD THEREOF

FIELD OF THE INVENTION

The present invention relates to an adapter device used for extending television content onto multiple portable devices such as mobile phones, tablets and laptops through a wireless intranet network. Further, the adapter device allows the users to connect wireless headsets or speakers through Bluetooth or Wi-Fi network to listen only to the audio thereby emitting the video content as per the user's requirements.

BACKGROUND OF THE INVENTION

Televisions are usually installed in public places such as hospitals, airports, bus stops, coffee shops, hotels, railway stations, offices, waiting lobbies, lounges, sports bars, stadiums, restaurants and public transportations to ensure that people in the vicinity are entertained. But it is often the case that not all the people in the area have the same choice when it comes to entertainment. In order to streamline expenses only one or two television channels are played in a room of average size due to which people are compelled to watch whatever has been broadcasted.

To ensure silence in the vicinity, televisions are usually kept on mute thereby broadcasting only the video content to the audience which often creates angst among the viewers. Further, as the distance between the television and the viewers increases, the visibility reduces to a great extent due to which the intention of installing a television in the room is lost. In order to facilitate better viewing experience for the audience, multiple televisions are installed which burns a huge hole in the owner's pockets as the money spent on buying and installing multiple televisions is very high.

In some open public places like public transportation bays and inside public transportation vehicles, placing and managing the televisions is merely difficult considering the theft or damage for the outdoor installed television units or inside the public transportation vehicles, also it is expensive to place many televisions to accommodate the viewers in such open public places. Entertaining such long waiting or travelling public is important through live television content at the same time without any risk and much cost.

In the stadiums the large televisions or large format display plays specific live game, however all spectators sitting in the stadium may not be able to view the television content played in large televisions, also it will cost huge to deploy multiple televisions or large format display units to cover-up the entire stadium spectators.

The patent application number EP2501146A2 discloses an apparatus for displaying live television in which the live television can be received and sent as output to a user on one or more display devices. Further, the patent document discusses a system which is configured to share data related to the television content by other users in a network having a channel selection option and also capable of providing audio content to the users. However, the major drawback of this invention is that it is a system and not a physical electronic portable device. It does not disclose any information about allowing the users to watch the television content in different screen resolutions as per the screen size of the portable device. Further, the patent document does not reveal any details about allowing users to connect the wireless headsets or speakers through Bluetooth or Wi-Fi network to listen to the audio alone thereby emitting the video of the television content. Also, the patent document does not disclose any information about viewing media content on the user's portable device without the use of internet.

The patent application number US2015195620A1 discloses a method and system for sharing content which includes detecting a secondary device that is paired to a main device. The main device is used to render publicly viewable content. Selection of a multimedia content for sharing, is detected at the secondary device. The selection causes the rendering of the multimedia content at a display screen of the secondary device. However, the major drawback of this invention is that it is a system and not a physical electronic portable device. It does not disclose any information about allowing the users to watch the television content in different screen resolutions as per the screen size of the portable device. Further, the patent document does not reveal any details about allowing users to connect the wireless headsets or speakers through Bluetooth or Wi-Fi network to listen to the audio alone thereby emitting the video of the television content. Also, the patent document does not disclose any information about viewing media content on the user's portable device without the use of internet.

The patent application number U.S. Pat. No. 9,258,342B2 discloses a method and apparatus for interactive mobile offer system using time and location for out-of-home display screens. The system disclosed in the patent document provides content to the consumers through the mobile devices based on the consumer's proximity to a display screen whose location is known to a server. The content includes one or more audio, video, images, or text. However, the major drawback of this invention is that it is a system and not a physical electronic portable device. It does not disclose any information about allowing the users to watch the television content with audio using the speaker or headphone of their portable device. Further, the patent document does not reveal any details about allowing users to connect the wireless headsets or speakers through Bluetooth/Wi-Fi network to listen to the audio alone thereby emitting the video of the television content. Also, the patent document does not disclose any information about viewing media content on the user's portable device without the use of internet.

Hence, there exists a need for a device and method that enables users to extend television content onto multiple portable devices such as mobile phones, tablets and laptops through a wireless intranet network with a multichannel viewing option thereby enabling a user to view a television content according to their choice.

SUMMARY OF THE INVENTION

Embodiments of the present invention aim to provide an adapter device that overcomes the drawbacks of the prior arts and enable users to extend television content onto mobile phones, laptops, or other portable devices with a multichannel viewing option in the vicinity of the users and automatically stream and render the television content along. Further, methods for extending television content are provided.

In accordance with an embodiment of the present invention, an adapter device for extending television content is provided. The adapter device comprising a plurality of input interface, a plurality of processing units, a plurality of output interface, a plurality of broadcasting units, a power supply, a microcontroller and a plurality of Wi-Fi extenders.

In accordance with an embodiment of the present invention, the plurality of input interface is configured to receive television content through, but not limited to, a first connector. Preferably, the first connector is, but not limited to, HDMi, AV, VGA, DVI, S-Video, SDI, USB, LAN, RF pin, display port, RCA connector.

In accordance with an embodiment of the present invention, the plurality of processing units configured to process received television content in real-time and provide processed television content in different resolutions and formats to the plurality of broadcasting units. Further, the plurality of processing units configured to by-pass received television content or processed television content directly to a plurality of output interface in accordance with output selection of a user of the adapter device. Preferably, the formats are, but not limited to, transcoded and encoded formats.

In accordance with an embodiment of the present invention, the plurality of output interface configured to send television content from the adapter device to a plurality of visual display units through, but not limited to, a second connector. Preferably, the second connector is, but not limited to, HDMi, AV, VGA, DVI, S-Video, SDI, USB, LAN, RF pin display port, RCA connector. Further, the plurality of visual display units is, but not limited to, a large format display screen, a television or monitor screen.

In accordance with an embodiment of the present invention, the plurality of broadcasting units configured to establish a Wi-Fi network to connect a first set of plurality of portable user devices and form a wireless intranet network and broadcast the processed television content to the first set of plurality of portable user devices to receive and render live stream link in which every television content has different live stream links to be established based on the television content opted on each of the first set of plurality of portable user devices using the wireless intranet network.

In accordance with an embodiment of the present invention, the plurality of Wi-Fi extenders configured to extend Wi-Fi strength or signal coverage of the established Wi-Fi network by the plurality of broadcasting units to a second set of plurality of portable user devices providing processed television content to the second set of plurality of portable user devices to receive and render live stream link in which every television content has different live stream links to be established based on the television content opted on each of the second set of plurality of portable user devices using the wireless intranet network. Preferably, the plurality of Wi-Fi extenders is, but not limited to, Wi-Fi repeaters, Wi-Fi extenders, wireless repeaters, Wi-Fi router and switches connected and configured through wire or wireless with the adapter device.

Further, the plurality of broadcasting units configured to establish a captive portal for connecting the first set of plurality of portable user devices and second set of plurality of portable user devices to receive and render the live stream link automatically after selecting the established Wi-Fi network. The plurality of broadcasting units further configured to establish a local Domain name for the connected first set of plurality of portable user devices and second set of plurality of portable user devices to access the client webpages along with live stream links by entering local domain name in their browser's address bar. Also, the plurality of broadcasting units configured to establish a Bluetooth network to connect the plurality of Bluetooth enabled user devices.

In accordance with an embodiment of the present invention, the plurality of Bluetooth enabled user devices configured to receive, but not limited to, audio signals.

In accordance with an embodiment of the present invention, an internet module is provided which is connected through wire or wireless with the external plurality of internet access point and configured to establish internet access to the adapter device and enable communication to external cloud applications to manage the adapter device activation or deactivation or subscriptions or licenses. Further, the internet module is configured to enable communication to external plurality of cloud applications for authorizing the first set of plurality of portable user devices and second set of plurality of portable user devices to view television content that is considered to be pay per view or paid or authorized view only or authorized through external payment gateway systems. Also, the internet module is configured to enable communication to external plurality of cloud application of internet television channel broadcast systems and establish access to live stream link and pass the internet television content to the plurality of processing units.

In accordance with an embodiment of the present invention, the internet television content processed in real-time and broadcasted, locally as live stream link through wireless intranet network.

In accordance with an embodiment of the present invention, the connected first set of plurality of portable user devices and second set of plurality of portable user devices watch internet television content in real-time through wireless intranet network.

In accordance with an embodiment of the present invention, the internet module is configured to provide Internet access to the first set of plurality of portable user devices and second set of plurality of portable user devices to stay connected over internet and to receive push notifications from other applications while rendering the television content live stream on their portable devices.

In accordance with an embodiment of the present invention, a data storage module is provided which is configured to provide high speed access to all the components of the adapter device to store and retrieve data.

In accordance with an embodiment of the present invention, the plurality of broadcasting units is configured to connect and use existing Wi-Fi intranet or WLAN or LAN with or without internet network to connect the second set of plurality of portable user devices through, but not limited to, unique mac address or local domain name assigned in existing Wi-Fi network by administrator In accordance with an embodiment of the present invention, the plurality of broadcasting units further configured to establish a plurality of servers to connect the first set of plurality of portable user devices and second set of plurality of portable user devices. Preferably, the plurality of servers is, but not limited to, Web servers, streaming servers, DHCP servers, DNS server, load balancing server.

In accordance with an embodiment of the present invention, the plurality of broadcasting units further comprising plurality of client web pages with user interface having inbuilt media players compatible to render the broadcasted live stream link in the connected first set of plurality of portable user devices portable devices and second set of plurality of portable user devices portable devices through, but not limited to, captive portal or browsers or custom client application In accordance with an embodiment of the present invention, the television content is, but not limited to, live video input from electronic devices, television or channel signal, output from large format display screen, a video, an audio, a video and audio, digital or analogue signal which compatible to view in the plurality of visual display units.

In accordance with an embodiment of the present invention, the live stream link comprises of, but not limited to, video only, video and audio, audio only.

In accordance with an embodiment of the present invention, a coupling means is provided to facilitate the adapter device to connect with plurality of other adapter devices. Preferably, the coupling means configured to connect the adapter device with plurality of other adapter devices in order to form a cluster. Further, the adapter device is configured to act as a load balancer to support any number of concurrent users.

In accordance with an embodiment of the present invention, a method executed by a system is provided. The method comprising the steps of establishing an IP address for the system with or without local domain name, establishing a wireless intranet network for a plurality of portable user devices to get connected, receiving a plurality of input signals that contains a plurality of television content, processing the received plurality of input signals in real-time, connecting the plurality of portable user devices with the established wireless network, broadcasting the processed plurality of input signals as plurality of live streams along with channel change options to the connected plurality of portable user devices for accessing and rendering the plurality of live streams via the connected wireless intranet network.

Preferably, wherein the wireless intranet network is a Wi-Fi access point with or without internet.

In accordance with an embodiment of the present invention, the plurality of portable user devices are portable devices such as, but not limited to, mobile phones, tablets and laptops. Further, the connected plurality of portable user devices is assigned with unique local IP for further communication between the system and each other.

Preferably, the plurality of input signals are digital or analogue signals. Further, the plurality of input signals is, but not limited to, internet television or IPTV live stream.

In accordance with an embodiment of the present invention, the plurality of television content is digital or analogue signal, compatible to view in, but not limited to, the plurality of television, monitor or large format display.

In accordance with an embodiment of the present invention, wherein the step of processing is carried out by transcoding and/or encoding processes.

Preferably, the plurality of live streams comprises of video only, video and audio, audio only. Further, the plurality of live streams is configured with embedded media players to eliminate the mandate need of client application. The embedded media player is an inbuilt-media player of the system to render the live stream in the connected plurality of portable user devices.

In accordance with an embodiment of the present invention, the channel change options are selected to change and render different live steam of different input signals. Further, the channel change options enable multi-channel view options on every connected plurality of portable user devices.

In accordance with an embodiment of the present invention, the connected plurality of portable user devices, access & renders the plurality of live streams automatically through captive portal while connecting with the wireless intranet network.

In accordance with an embodiment of the present invention, the connected plurality of portable user devices access & renders the plurality of live streams through browsers by accessing system's local domain name or IP address.

In accordance with an embodiment of the present invention, the connected plurality of portable user devices access & renders the plurality of live streams through custom client application.

In accordance with an embodiment of the present invention, the connected plurality of portable user devices renders all received live streams in an embedded media player of the system or on their default media player.

In accordance with an embodiment of the present invention, the connected plurality of portable user devices renders different live stream as per the selected channel options on respective portable device.

In accordance with an embodiment of the present invention, the plurality of live streams access to connected portable devices is further configured with payment gateway systems to grant access after successful payment transaction.

In accordance with an embodiment of the present invention, the plurality of live streams access to connected portable devices is further configured with access code systems to grant access after successful authorization of entered access code.

In accordance with an embodiment of the present invention, a method for extending television content is provided. The method comprising the steps of receiving the television content from a plurality of input interface, processing the received television content in real-time by a plurality of processing units, providing processed television content in different resolutions and formats to a plurality of broadcasting units, establishing a Wi-Fi network by a plurality of broadcasting units and broadcasting the processed television content as live stream link in which every television content has different live stream links to be established based on the television content opted on each of a first set of plurality of portable user devices and a second set of plurality of portable user devices using a wireless intranet network.

In accordance with an embodiment of the present invention, the method further comprising a step of connecting the first set of plurality of portable user devices to the established Wi-Fi network and forming the wireless intranet network.

In accordance with an embodiment of the present invention, the method further comprising a step of extending Wi-Fi strength or signal coverage of the established Wi-Fi network to the second set of plurality of portable user devices by using a plurality of Wi-Fi extenders.

In accordance with an embodiment of the present invention, the step of extending further comprising the steps of connecting and using existing Wi-Fi intranet or internet or WLAN or LAN network to connect the second set of plurality of portable user devices through unique mac address or local domain name assigned in existing Wi-Fi network by administrator.

In accordance with an embodiment of the present invention, the method further comprising a step of establishing a Bluetooth network to connect a plurality of Bluetooth enabled user devices.

In accordance with an embodiment of the present invention, a step of providing plurality of client web pages with user interface having inbuilt media players compatible is further provided to render the broadcasted live stream link in the connected first set of plurality of portable user devices and second set of plurality of portable user devices portable devices through captive portal or browsers or custom client application.

In accordance with an embodiment of the present invention, a step of establishing a captive portal is further provided for connecting first set of plurality of portable user devices and second set of plurality of portable user devices to receive and render the live stream link automatically after selecting the established Wi-Fi network.

In accordance with an embodiment of the present invention, a step of establishing a local Domain name is further provided for the connected first set of plurality of portable user devices and second set of plurality of portable user devices to receive and render client webpages along with the live stream links by entering local domain name in their browser's address bar after connecting to the established Wi-Fi network.

In accordance with an embodiment of the present invention, a step of establishing a plurality of servers by the plurality of broadcasting units is further provided to connect the first set of plurality of portable user devices and second set of plurality of portable user devices.

In accordance with an embodiment of the present invention, a step of by-passing is further provided to receive television content or processed television content directly to the plurality of output interface according to output selection of the user. Further, the step of by-passing comprising a step of transmitting television content from the adapter device to a plurality of visual display units through a second connector.

In accordance with an embodiment of the present invention, a step of connecting the adapter device with plurality of other adapter devices is provided by coupling means.

In accordance with an embodiment of the present invention, the step of connecting further comprising a step of forming a cluster by connecting the adapter device with plurality of other adapter devices. Preferably, the adapter device is configured to act as a load balancer to support any number of concurrent users.

In accordance with an embodiment of the present invention, a step of establishing internet access, is further provided by an internet module, to the adapter device and enabling communication to external cloud applications to manage the adapter device activation or deactivation or subscriptions or licenses.

In accordance with an embodiment of the present invention, a step of enabling communication, is further provided by the internet module, to external plurality of cloud applications for authorizing the user to view television content that is considered to be pay per view or paid or authorized view only or authorized through external payment gateway systems.

In accordance with an embodiment of the present invention, a step of enabling communication, is further provided by the internet module, to external plurality of cloud application of internet television channel broadcast systems and establish access to live stream link and pass the internet television content to the plurality of processing units.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE DRAWINGS

Figure 1:
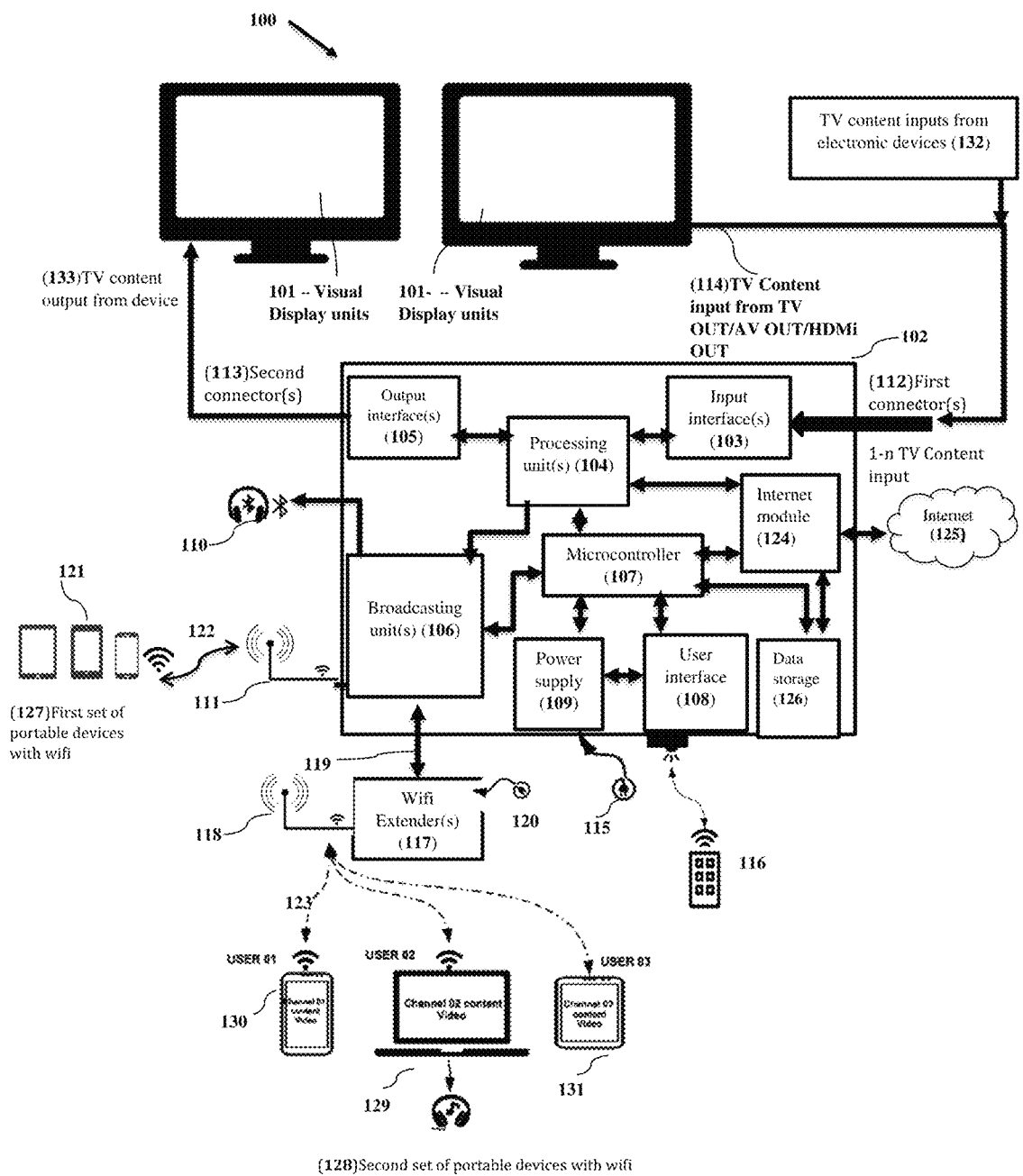
FIG. 1 illustrates a system employing an adapter device for extending television content, in accordance with an embodiment of the present invention.

The present invention is described hereinafter by various embodiments with reference to the accompanying drawing, wherein reference numerals used in the accompanying drawing correspond to the like elements throughout the description.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Further, the various embodiments described herein below include specific method steps in an exemplary order but a wide variety of other such method steps could be implemented within the scope of the invention, including additional steps, omission of some steps, or performing the method in a different order.

The present invention aims to overcomes the drawbacks of the prior art by providing a television extender adapter device that enables users to extend television content onto mobile phones, laptops, or other portable devices with a multichannel viewing option in the vicinity of the users. The adapter device provides a Wi-Fi network for all portable device users to connect and view the television content of their choice on their Wi-Fi-enabled portable devices consisting of a compatible browser or captive portal or custom client application. When a user connects his or her device to the adapter device's Wi-Fi network which functions on an wireless intranet network, the captive portal browser in their portable device opens automatically and streams the television content, along with a user interface to switch channels. Further, the user can also type a local domain name on the browser to access the live stream TV content using a wireless intranet network thereby eliminating the requirement of an internet. Instead of browser, also user can download, install and use custom client application to access the live streaming content along with client user interface The provision of the adapter device to allow users to extend the television content onto portable devices in the vicinity of the users facilitates the users of the portable devices to watch the content of their choice with the wireless intranet network. Further, if the user wishes to listen only to the audio and thereby emit the video content, he or she can stream the audio through Bluetooth network using the speakers or headphones compatible with their respective portable devices. The proposed invention further involves the adapter device which provides the users an option to choose any channel from a list of available channels irrespective of the channel playing on the television. Further, the adapter device may also be integrated with the television as a future advancement of the present invention. However, a person skilled in the art would appreciate that the invention is not limited to the exemplary environment discussed below alone and can be implemented in various other physical environments, without departing from the scope of the invention.

Referring to the drawings, the invention will now be described in more detail. FIG. 1 illustrates a system (100) employing an adapter device for extending a television content to plurality of portable user devices, in accordance with an embodiment of the present invention. As shown in FIG. 1, the system (100) having a plurality of visual display units (101), an adapter device (102), a plurality of first set of portable user devices (127) and a plurality of second set of portable user devices (128).

The plurality of visual display units (101) is, but not limited to, a large format display screen, a television or monitor screen. The plurality of visual display units (101) configured to extend a television content to portable plurality of first set of portable user devices (127) and the plurality of second set of portable user devices (128) through the adapter device (102).

Preferably, the plurality of first set of portable user devices (127) and the plurality of second set of portable user devices (128) are, but not limited to, mobile, laptop, tablet, desktop, display screen etc. Also, the plurality of visual display units (101) is, but not limited to, a large format display screen, a television or monitor screen.

Further, the television content is, but not limited to, live video input from electronic devices, television or channel signal, output from large format display screen, a video, an audio, a video and audio, digital or analogue signal which compatible to view in the plurality of visual display units.

In accordance with an embodiment of the present invention, the adapter device (102) having a plurality of input interface (103), a plurality of processing units (104), a plurality of output interface (105), a plurality of broadcasting units (106), a power supply (109), a microcontroller (107), user interface (108), a plurality of Wi-Fi extenders (117), an internet module (124) and a data storage module (126).

The plurality of input interface (103) configured to receive television content through, but not limited to, a first connector (112). Preferably, the first connector (112) is, but not limited to, HDMi, AV, VGA, DVI, S-Video, SDI, USB, LAN, RF pin, display port, RCA connector.

Further, the plurality of input interface (103) is configured to intake different type of cables.

The plurality of processing units (104) configured to process received television content in real-time and provide processed television content output in different resolutions and formats to the plurality of broadcasting units (106). Further, the plurality of processing units (104) configured to by-pass received television content or processed television content directly to the plurality of output interface (105) in accordance with output selection of a user. Preferably, the formats are, but not limited to, transcoded and encoded formats.

Further, the plurality of processing units (104) have plurality of software or hardware based media encoders and transcoders.

The plurality of output interface (105) configured to send television content from the adapter device (102) to the plurality of visual display units (101) through, but not limited to, a second connector (113). Preferably, the second connector (113) is, but not limited to, HDMi, AV, VGA, DVI, S-Video, SDI, USB, LAN, RF pin display port, RCA connector.

Further, plurality of output interface (105) is configured to connect with different type of cables.

The plurality of broadcasting units (106) is configured to establish a Wi-Fi network (111) to connect the first set of plurality of portable user devices (127) and form a wireless intranet network. Further, the plurality of broadcasting units (106) is configured to broadcast the processed television content to the first set of plurality of portable user devices (127) to receive live stream link in which every television content has different live stream links to be established based on the user's television content choice using the wireless intranet network. Preferably, the live stream link comprises of, but not limited to, video only, video and audio, audio only.

The plurality of broadcasting units (106) is further configured to establish a captive portal for connecting the first set of plurality of portable user devices (127) and the second set of plurality of portable user devices (128) to receive and render the live stream link automatically after selecting the established Wi-Fi network (111,118). Further, the plurality of broadcasting units (106) is further configured to establish a local Domain name for the connected first set of plurality of portable user devices (127) and second set of plurality of portable user devices (128) to access the client webpages along with live stream links by entering local domain name in their browser's address bar.

Also, the plurality of broadcasting units (106) is configured to establish a Bluetooth network (110) to connect the plurality of Bluetooth enabled user devices (not shown).

Preferably, the plurality of Bluetooth enabled user devices configured to receive, but not limited to, audio signals.

In accordance with an embodiment of the present invention, the plurality of broadcasting units (106) is configured to connect and use existing Wi-Fi intranet or WLAN or LAN with or without internet network (501) to connect the second set of plurality of portable user devices (128) through, but not limited to, unique mac address or local domain name assigned in existing Wi-Fi network (501) by administrator. The plurality of broadcasting units (106) is further configured to establish, a plurality of servers to connect the first set of plurality of portable user devices (127) and second set of plurality of portable user devices (128). Preferably, the plurality of servers is, but not limited to, Web servers, streaming servers, DHCP servers, DNS server, server with a load balancing server.

Also, the plurality of broadcasting units further comprising plurality of client web pages with user interface having inbuilt media players compatible to render the broadcasted live stream link in the connected first set of plurality of portable user devices (127) and second set of plurality of portable user devices portable devices (128) through captive portal or browsers. This eliminates the mandate need of separate client application in the connected portable devices to render the television content live stream links. Further, the plurality of broadcasting units (106) have plurality of Wi-Fi radio modules with multiple antennas and plurality of Bluetooth radio modules.

The plurality of Wi-Fi extenders (117) configured to extend Wi-Fi strength or signal coverage of the established Wi-Fi network (111) by the plurality of broadcasting units (106) to the second set of plurality of portable user devices (128). Preferably, the plurality of Wi-Fi extenders (117) is, but not limited to, Wi-Fi repeaters, Wi-Fi extenders, wireless repeaters, Wi-Fi routers and switches connected and configured through wire or wireless with the adapter device (102).

The internet module (124) connected through wire or wireless with the external plurality of internet access point (125) or Internet Service Provider (ISP) and configured to establish internet access to the adapter device (102). Further, the internet module (124) enable communication to external cloud applications to manage activation or deactivation or subscriptions or licenses of the adapter device (102) and for authorizing the user to view television content that is pay per view or paid or authorized view only or authorized through external payment gateway systems. Also, the internet module (124) is configured to enable communication to external plurality of cloud application of internet television channel broadcast systems and establish access to live stream link and pass the internet television content to the plurality of processing units (104). Preferably, the internet television content processed in real-time and broadcasted locally as live stream link through wireless intranet network (111) enabling the users to watch internet television content in real-time through the wireless intranet network (111).

The data storage module (126) is provided which is configured to provide high speed access to all the components of the adapter device (102) to store and retrieve data.

The microcontroller (107) controls all the aforesaid components of the adapter device (102). It also provides interface to users to help them configure certain settings of the adapter device (102).

The power supply (109) is provided to supply power to the entire adapter device (102). Preferably, the power supply is, but not limited to, a battery or an AC-DC powered device.

In accordance with an exemplary embodiment of the present invention, as shown in FIG. 1, the adapter device (102) receives its input ranging from 1 to n television channels from the input interface (103) consisting of different type of connectors like HDMi, AV, VGA, DVI, S-Video, SDI, USB, LAN, RF pin display port, RCA connector to obtain channel or television signal into the adapter device (102). Thereafter, the plurality of processing units (104) process the input signals from the input interface (103) in real-time and provide video and audio only output in different resolutions and encoding formats to the plurality of broadcasting units (106) and by-pass received television content or processed television content directly to a plurality of output interface (105) in accordance with output selection of a user of the adapter device (102). Further, the plurality of broadcasting unit (106) establishes Wi-Fi network (111) for first set of plurality of user devices (127) such as mobile phones, laptops and tablets to get connected and receive & render live stream link. Every channel will have a different ID or stream link. Based on the user's choice of channel, the respective stream connection will be established. The plurality of broadcasting unit (106) also establishes a Bluetooth network (110) for Bluetooth enabled user headsets or devices to get connected and receive live audio streaming content. Furthermore, the adapter device (102) extend the television content to second set of plurality of user devices (128) through the plurality of Wi-Fi extenders (117) enabling to receive and render the live stream link thereby providing them the channel of their choice on their respective portable device. It is pertinent to mention that the second set of plurality of user devices (128) are not connected with the established Wi-Fi network (111) by the plurality of broadcasting units (106) rather they are connected with the Wi-Fi network (118) with same SSID or different SSID.

Figure 2A:
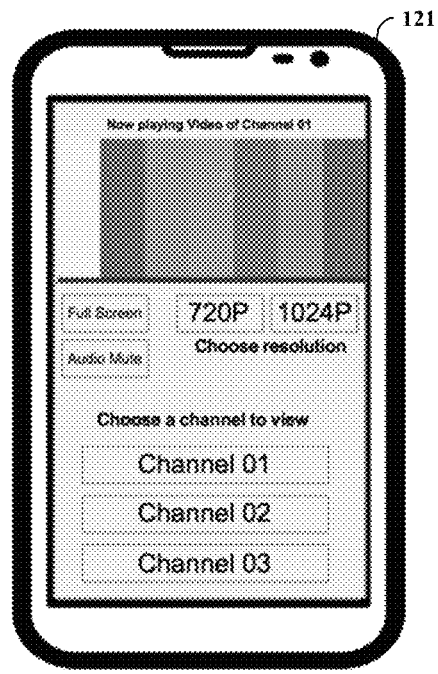
FIG. 2A illustrates a user interface that enables users to view television content on their portable devices, in accordance with an embodiment of the present invention.
Figure 2B:
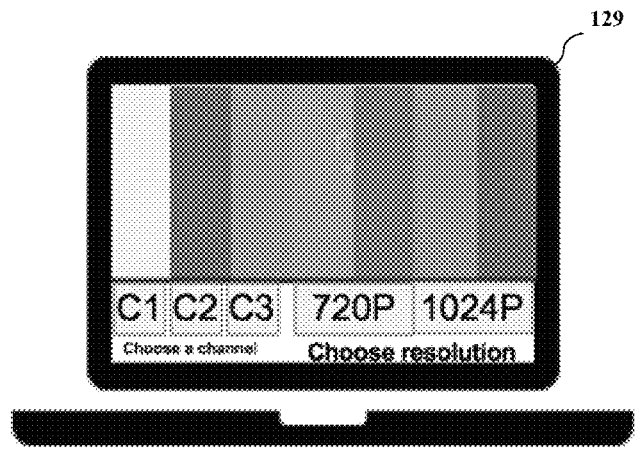
FIG. 2B illustrates a user interface that enables users to view television content on their devices, in accordance with an embodiment of the present invention.

FIG. 2A illustrates a user interface (121) that enables users to view television content on their portable devices such as mobiles, tablets etc. and provides number of options such as changing of channels, setting resolution of the rendered content etc. The FIG. 2B illustrates a user interface (129) that enables users to view television content on their devices such as desktop, laptop etc. The user interface for laptops or desktops is the same interface of the mobile device. Thus, the adapter device (102) proposed in the present invention allows users to extend a television content onto portable devices such as mobile phones, laptops and tablets in the vicinity of the users with a multichannel viewing option thereby enabling a user of the portable device to view a television channel in real-time according to their choice.

Figure 3:
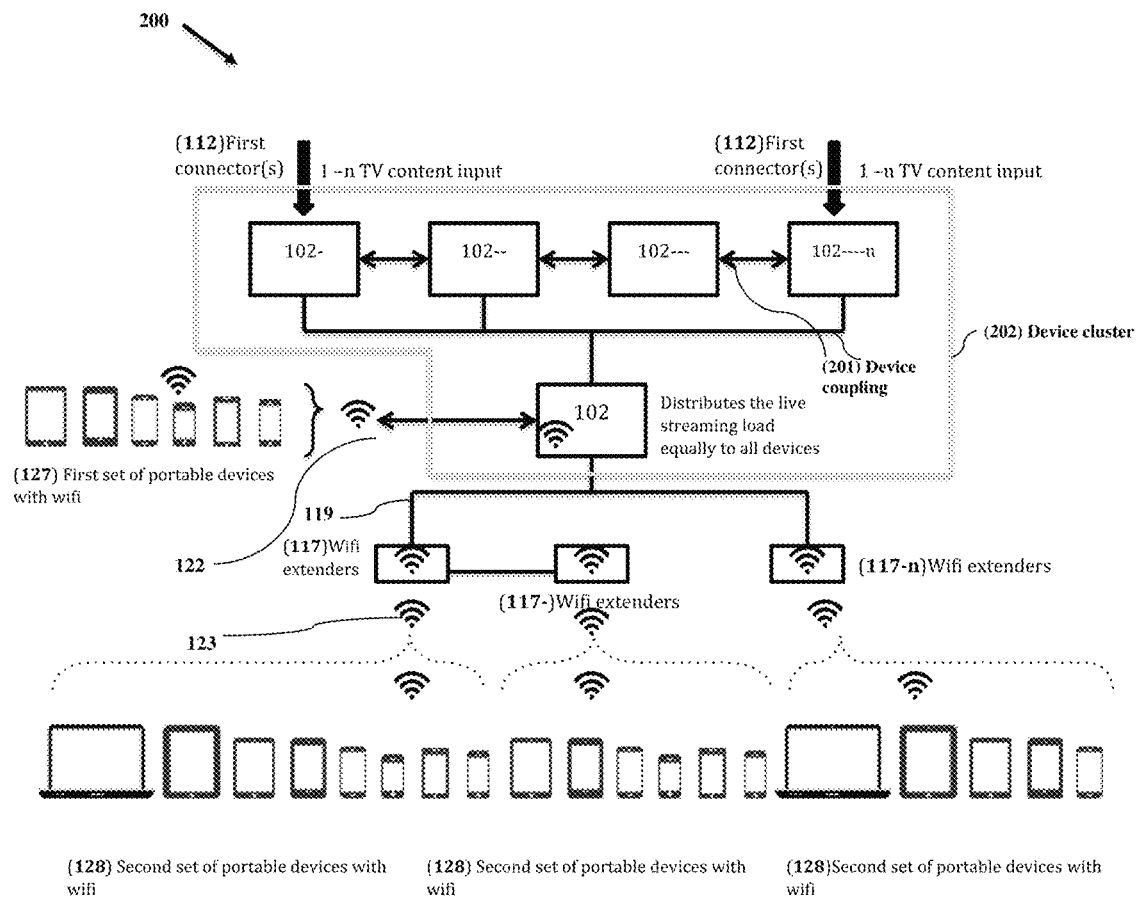
FIG. 3 illustrates a system wherein an adapter device is coupled with other adapter devices for extending television content to plurality of portable user devices, in accordance with an embodiment of the present invention.

FIG. 3 illustrates a system (200) wherein an adapter device (102) is coupled with other adapter devices ($102_1 \ldots 102_n$) for extending a television content to plurality of portable user devices, in accordance with an embodiment of the present invention. As shown in FIG. 3, the adapter device (102) comprises of a coupling means (201). The coupling means (201) is provided to facilitate the adapter device (102) to connect with plurality of other adapter devices ($102_1 \ldots 102_n$). Preferably, the coupling means (201) configured to connect the adapter device (102) with plurality of other adapter devices ($102_1 \ldots 102_n$) in order to form a cluster (202). Further, the adapter device (102) acts as a load balancer to support any number of concurrent users and to distribute the streaming load equally to all the other adapter devices ($102_1 \ldots 102_n$) clustered together in the cluster (202).

Figure 4:
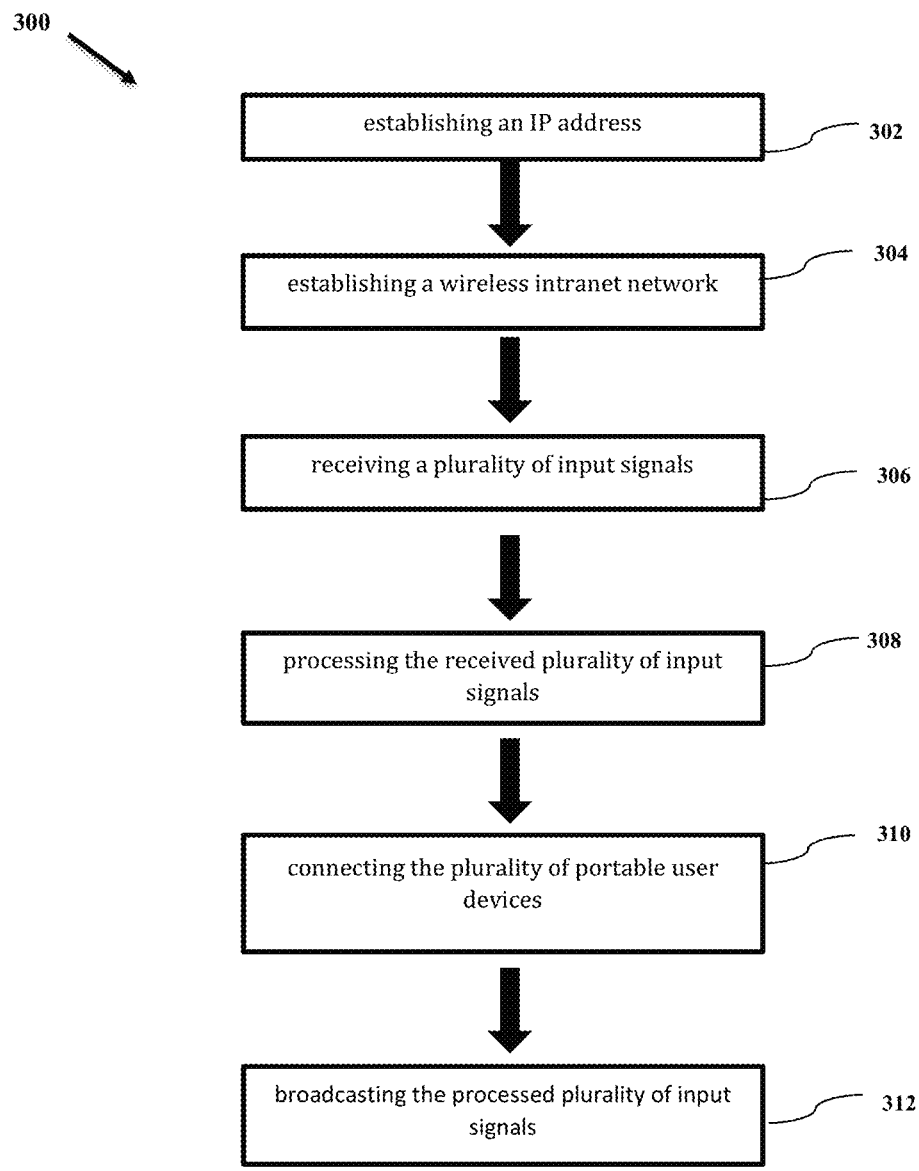
FIG. 4 is a flow chart illustrating a method executed by a system, in accordance with an embodiment of the present invention.

FIG. 4 is a flow chart illustrating a method (300) executed by a system, in accordance with an embodiment of the present invention.

At step 302, an IP address is established for the system with or without local domain name.

At step 304, a wireless intranet network established for a plurality of portable user devices to get connected. Preferably, the wireless intranet network is a Wi-Fi access point with or without internet. Further, the plurality of portable user devices are portable devices such as, but not limited to, mobile phones, tablets and laptops. Also, the connected plurality of portable user devices is assigned with unique local IP for further communication between the system and each other.

At step 306. a plurality of input signals received that contains a plurality of television content. Preferably, the plurality of television content is digital or analogue signal, compatible to view in, but not limited to, the plurality of television, monitor or large format display.

At step 308, the received plurality of input signals is processed in real-time. The step of processing is carried out by transcoding and/or encoding processes.

At step 310, the plurality of portable user devices is connected with the established wireless network.

At step 312, the processed plurality of input signals is broadcasted as plurality of live streams along with channel change options to the connected plurality of portable user devices for accessing and rendering the plurality of live streams via the connected wireless intranet network. Preferably, the plurality of input signals are digital or analogue signals. Further, the plurality of input signals is, but not limited to, internet television or IPTV live stream. Also, the channel change options are selected to change and render different live steam of different input signals. The channel change options enable multi-channel view options on every connected plurality of portable user devices.

The connected plurality of portable user devices, access & renders the plurality of live streams automatically through captive portal while connecting with the wireless intranet network.

Further, the connected plurality of portable user devices access & renders the plurality of live streams through browsers by accessing system's local domain name or IP address.

Also, the connected plurality of portable user devices access & renders the plurality of live streams through custom client application.

In accordance with an embodiment of the present invention, the connected plurality of portable user devices renders all received live streams in an embedded media player of the system or on their default media player. Further, the connected plurality of portable user devices renders different live stream as per the selected channel options on respective portable device.

The plurality of live streams comprises of video only, video and audio, audio only. Further, the plurality of live streams is configured with embedded media players to eliminate the mandate need of client application. The embedded media player is an inbuilt-media player of the system to render the live stream in the connected plurality of portable user devices.

In accordance with an embodiment of the present invention, the plurality of live streams access to connected portable devices is further configured with payment gateway systems to grant access after successful payment transaction. The plurality of live streams access to connected portable devices is further configured with access code systems to grant access after successful authorization of entered access code.

Figure 5:
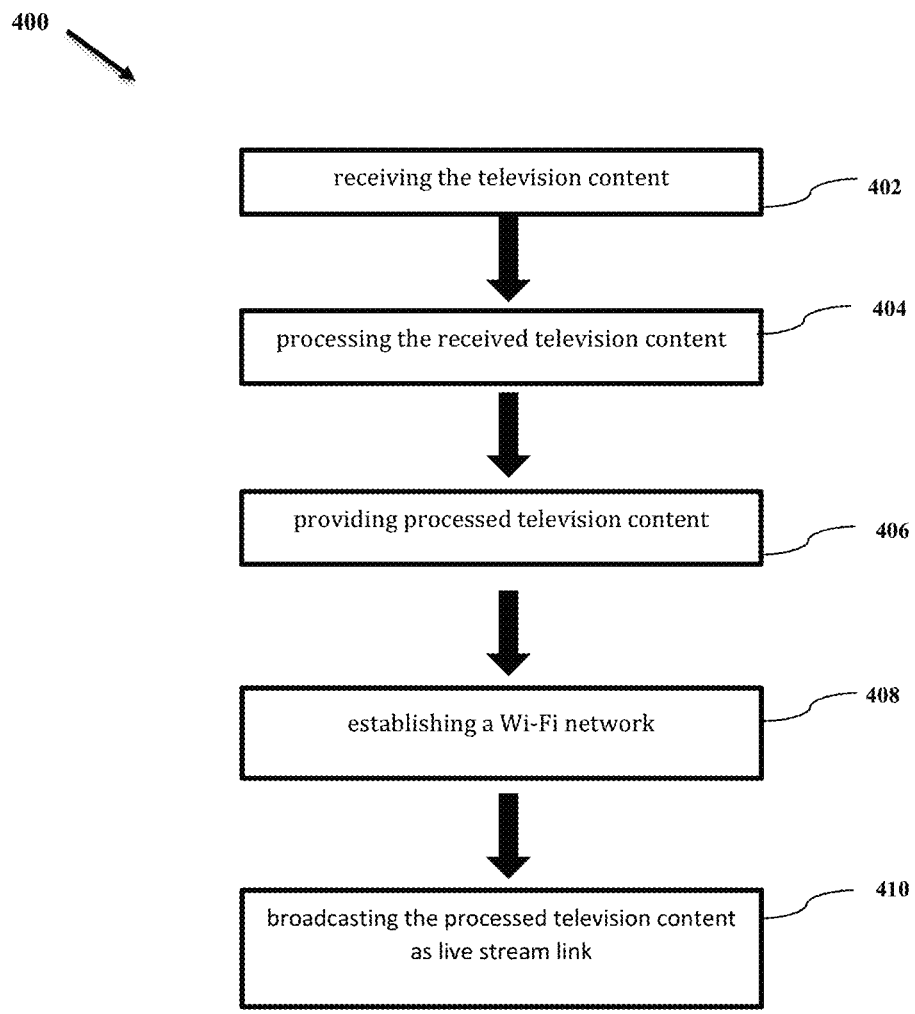
FIG. 5 is a flow chart illustrating a method for extending television content, in accordance with an embodiment of the present invention.

FIG. 5 is a flow chart illustrating a method (400) for extending television content in accordance with an embodiment of the present invention.

At step 402, the television content from a plurality of input interface (103) is received through a first connector (112). Preferably, the first connector (112) is, but not limited to, HDMi, AV, VGA, DVI, S-Video, SDI, USB, LAN, RF pin, display port, RCA connector. Further, the plurality of input interface (103) is configured to intake different type of cables.

At step 404, the received television content is processed in real-time by a plurality of processing units (104) and at step 406 the processed television content is provided as output in different resolutions and formats to a plurality of broadcasting units (104). Further, the step 404 comprising a step of by-passing receiving television content or processed television content directly to the plurality of output interface (105) in according with output selection of the user. Preferably, the formats are transcoded and encoded formats. Further, the step of by-passing comprising a step of transmitting television content from the adapter device (102) to a plurality of visual display units (101) through a second connector (113).

Preferably, the second connector (113) is, but not limited to, HDMi, AV, VGA, DVI, S-Video, SDI, USB, LAN, RF pin, display port, RCA connector. The television content is live video input from electronic devices, television or channel signal, output from large format display screen, a video, an audio, a video and audio. Further, the television content is, but not limited to, digital or analogue signal, compatible to view in the plurality of visual display units (101). Also, the plurality of visual display units (101) is, but not limited to, large format display screen, television or monitor screen.

At step 408, a Wi-Fi network (111) is established by a plurality of broadcasting units (106). Further, a first set of plurality of portable user devices (127) are connect to the established Wi-Fi network (111) and forming a wireless intranet network. Also, the Wi-Fi network (111) is an intranet or WLAN or LAN with or without internet.

At step 410, the processed television content is broadcasted as live stream link in which every television content has different live stream links to be established based on the user's television content choice using the wireless intranet network. Preferably, the live stream link comprises of video only, video and audio, audio only.

Further, Wi-Fi strength or signal coverage of the established Wi-Fi network (111) is extended to a second set of plurality of portable user devices (128) by using a plurality of Wi-Fi extenders (117). Preferably, the plurality of Wi-Fi extenders (117) are, but not limited to, Wi-Fi repeaters, Wi-Fi extenders, wireless repeaters, Wi-Fi routers and switches connected and configured through wire or wireless with the adapter device (102). Also, the existing Wi-Fi intranet or internet or WLAN or LAN network (501) is used to connect the second set of plurality of portable user devices (128) through unique mac address or local domain name assigned in existing Wi-Fi network (501) by administrator.

Further, a step of establishing a captive portal for connecting first set of plurality of portable user devices (127) and second set of plurality of portable user devices (128) is provided, in accordance with an embodiment of the present invention, receive and render the live stream link automatically after selecting the established Wi-Fi network (111,118). Also, a step of establishing a local Domain name for the connected first set of plurality of portable user devices (127) and second set of plurality of portable user devices (128) is provided, in accordance with an embodiment of the present invention, to receive and render client webpages along with the live stream links by entering local domain name in their browser's address bar after connecting to the established Wi-Fi network (111,118).

The method (400) comprising a step of providing plurality of client web pages with user interface having inbuilt media players compatible to render the broadcasted live stream link in the connected first set of plurality of portable user devices (127) and second set of plurality of portable user devices portable devices (128) through captive portal or browsers or custom client application. Also, a step of establishing a plurality of servers, is provided, by the plurality of broadcasting units (106) to connect the first set of plurality of portable user devices (127) and second set of plurality of portable user devices (128).

The method (400) further comprises a step of establishing a Bluetooth network (110) to connect a plurality of Bluetooth enabled user devices. The plurality of Bluetooth enabled user devices configured to receive audio signals.

The method (400) further comprises a step of connecting the adapter device (102) with plurality of other adapter devices ($102_1 \ldots 102_n$) by coupling means (201) followed by a step of forming a cluster (202) by connecting the adapter device (102) with plurality of other adapter devices ($102_1 \ldots 102_n$). Preferably, the adapter device (102) is configured to act as a load balancer to support any number of concurrent users.

The method (400) further comprises a step of establishing internet access, by an internet module (124), to the adapter device (102) and enabling communication to external cloud applications to manage the adapter device (102) activation or deactivation or subscriptions or licenses.

The method (400) also provides step for enabling communication, by the internet module (124), to external plurality of cloud applications for authorizing the user to view television content that is considered to be pay per view or paid or authorized view only or authorized through external payment gateway systems. Further, a step of enabling communication, is provided by the internet module (124), to external plurality of cloud application of internet television channel broadcast systems and establish access to live stream link and pass the internet television content to the plurality of processing units (104).

Figure 6:
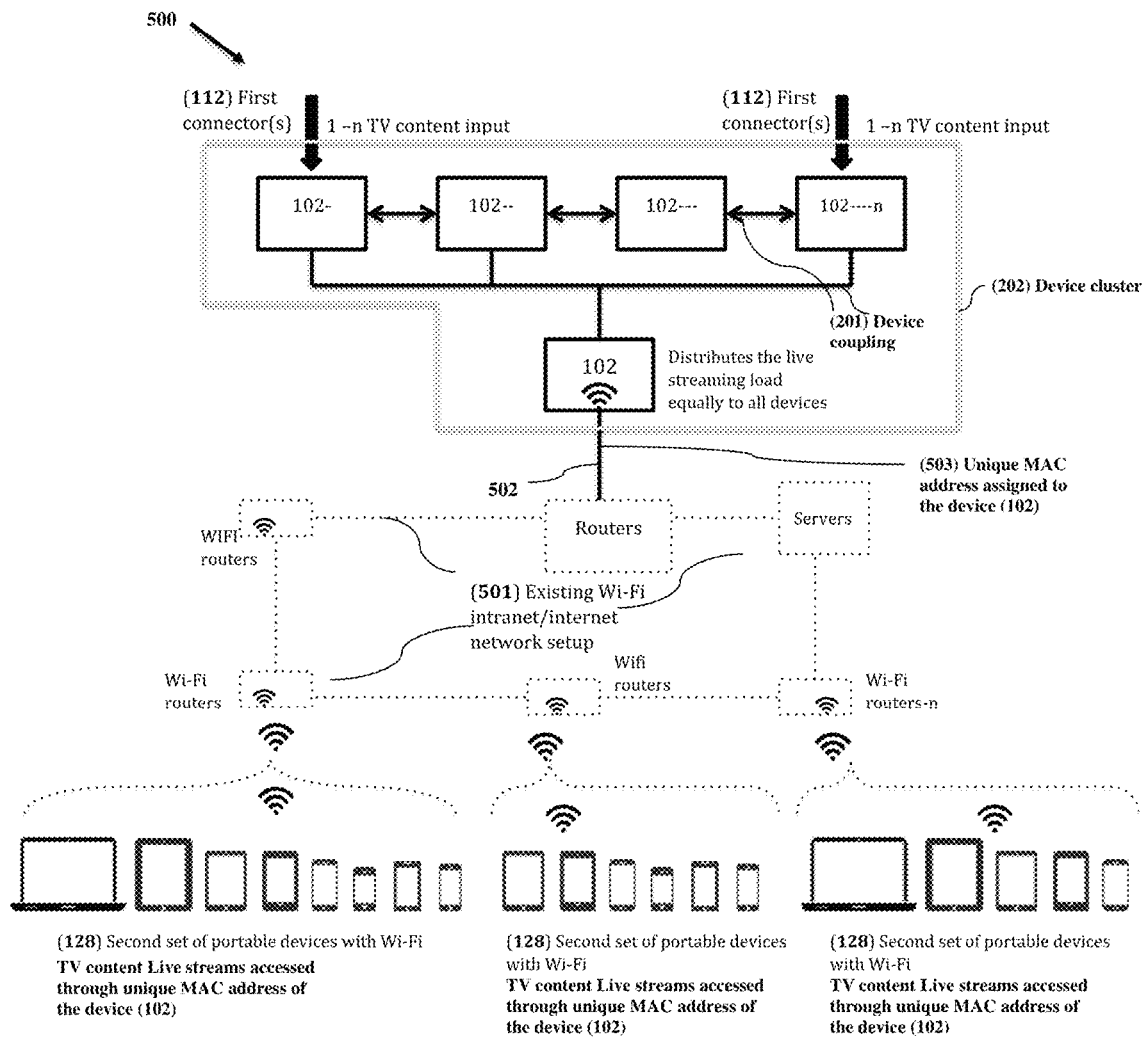
FIG. 6 illustrates a system wherein an adapter device is coupled with other adapter devices for extending television content to plurality of portable user devices, in accordance with an exemplary embodiment of the present invention.

FIG. 6 illustrates a system (500) wherein the television content is required to be extended to the second set of plurality of portable user devices (128) over an existing network (501). Preferably, the existing network (501) is, but not limited to, existing Wi-Fi intranet or internet or WLAN or LAN network. As shown in FIG. 6, the adapter device (102) and other adapter devices ($102_1 \ldots 102_n$) are connected in the form the cluster (202) are coupled wired or wirelessly with the existing network (501). Preferably, the existing network (501) can be of, but not limited to, stadium, hospital, airport, railway station. The adapter device (102) acts as a load balancer to support any number of concurrent users and to distribute the streaming load equally to all the other adapter devices ($102_1 \ldots 102_n$) clustered together in the cluster (202). Further, the adapter device (102) and other adapter devices ($102_1 \ldots 102_n$) configured to connect the second set of plurality of portable user devices (128) through unique mac address or local domain name (503) assigned in existing Wi-Fi network (501) by administrator.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

I claim:

1. An adapter device (102) for extending television content comprising:
    a) a plurality of input interface (103) configured to receive television content through a first connector (112);
    b) a plurality of processing units (104) configured to:
        process received television content in real-time and provide processed television content in different resolutions and formats to a plurality of broadcasting units (106); and
        by-pass received television content or processed television content directly to a plurality of output interface (105) in accordance with output selection of a user of the adapter device (102);
    c) the plurality of output interface (105) configured to send television content from the adapter device (102) to a plurality of visual display units (101) through a second connector (113);
    d) the plurality of broadcasting units (106) configured to:
        establish a Wi-Fi network (111) to connect first set of plurality of portable user devices (127) and form a wireless intranet network;
        broadcast processed television content to the first set of plurality of portable user devices (127) to receive and render live stream link in which every television content has different live stream links to be established based on the television content opted on each of the first set of plurality of portable user devices (127) using the wireless intranet network;
    e) a power supply (109);
    f) a microcontroller (107);
    g) a plurality of Wi-Fi extenders (117) configured to extend Wi-Fi strength or signal coverage of the established Wi-Fi network (111) by the plurality of broadcasting units (106) to a second set of plurality of portable user devices (128) and providing processed television content to the second set of plurality of portable user devices (128) to receive and render live stream link in which every television content has different live stream links to be established based on the television content opted on each of the second set of plurality of portable user devices (128) using the wireless intranet network;
    wherein the plurality of broadcasting unit (106) further configured to:
        establish a captive portal for connecting first set of plurality of portable user devices (127) and a second set of plurality of portable user devices (128) to receive and render the live stream link automatically after selecting the established Wi-Fi network (111);
        establish a local Domain name for the connected first set of plurality of portable user devices (127) and second set of plurality of portable user devices (128) to receive and render client webpages along with the live stream links by entering local domain name in their browser's address bar or after connecting to the established Wi-Fi network (111,118);

establish a Bluetooth network (110) to connect the plurality of Bluetooth enabled user devices;

wherein the plurality of Wi-Fi extenders (117) are Wi-Fi repeaters, Wi-Fi extenders, wireless repeaters, Wi-Fi routers and switches connected and configured through wire or wireless with the device;

wherein the plurality of Bluetooth enabled user devices configured to receive audio signals;

wherein the formats are transcoded and encoded formats.

2. The device (102) as claimed in claim 1, wherein the internet module (124) is configured to provide Internet access to the first set of plurality of portable user devices (127) and second set of plurality of portable user devices (128) to stay connected over internet and to receive push notifications from other applications while rendering the television content live stream on their portable devices.

3. The device (102) as claimed in claim 1, wherein the wireless intranet network is an intranet or WLAN or LAN with or without internet.

4. The device (102) as claimed in claim 1, further comprising data storage module (126) configured to provide access to all the components of the adapter device (102) to store and retrieve data.

5. The device (102) as claimed in claim 1, wherein the plurality of broadcasting units (106) is configured to connect and use existing Wi-Fi intranet or internet or WLAN or LAN network (501) to connect the second set of plurality of portable user devices (128) through unique mac address or local domain name assigned in existing Wi-Fi network (501) by administrator.

6. The device (102) as claimed in claim 1, wherein the plurality of broadcasting units (106) further configured to establish a plurality of servers to connect the first set of plurality of portable user devices (127) and the second set of plurality of portable user devices (128).

7. The device (102) as claimed in claim 1, wherein the plurality of broadcasting units (106) further comprising plurality of client web pages with user interface having inbuilt media players compatible to render the broadcasted live stream link in the connected first set of plurality of portable user devices (127) and second set of plurality of portable user devices portable devices (128) through captive portal or browsers or custom client application.

8. The device (102) as claimed in claim 1, wherein the television content is live video input from electronic devices, television or channel signal, output from large format display screen, a video, an audio, a video and audio.

9. The device (102) as claimed in claim 1, wherein the television content is digital or analogue signal, compatible to view in the plurality of visual display units (101).

10. The device (102) as claimed in claim 1, wherein the first connector (112) is HDMi, AV, VGA, DVI, S-Video, SDI, USB, LAN, RF pin, display port, RCA connector.

11. The device (102) as claimed in claim 1, wherein the second connector (113) is HDMi, AV, VGA, DVI, S-Video, SDI, USB, LAN, RF pin display port, RCA connector.

12. The device (102) as claimed in claim 1, wherein the live stream link comprises of video only, video and audio, audio only.

13. The device (102) as claimed in 1, wherein the plurality of visual display units (101) is a display screen.

14. The device (102) as claimed in 1, wherein the plurality of visual display units (101) is television or monitor screen.

15. The device (102) as claimed in claim 1, further comprising a coupling means (201) enabling the adapter device (102) to connect with plurality of other adapter devices (102$_1$ ... 102$_n$).

16. The device (102) as claimed in claim 15, wherein the coupling means (201) configured to connect the adapter device (102) with plurality of other adapter devices (102$_1$ ... 102$_n$) in order to form a cluster (202).

17. The device (102) as claimed in claim 15, wherein the adapter device (102) is configured to act as a load balancer.

* * * * *